Patented May 22, 1923.

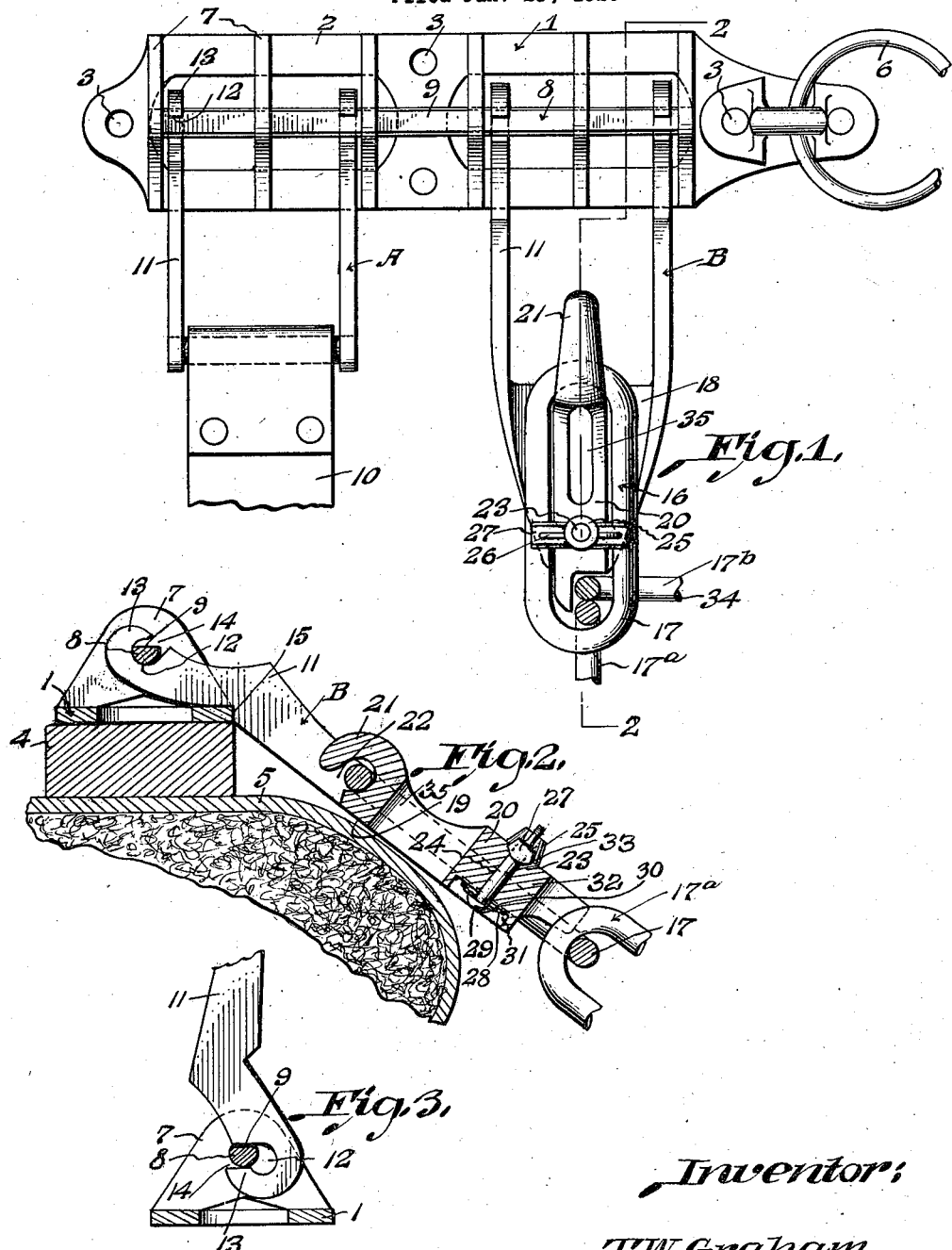

1,456,020

UNITED STATES PATENT OFFICE.

THOMAS W. GRAHAM, OF BLUE MOUNTAIN, MISSISSIPPI.

HAME TUG.

Application filed January 29, 1920. Serial No. 354,952.

*To all whom it may concern:*

Be it known that I, THOMAS W. GRAHAM, a citizen of the United States, residing at Blue Mountain, in the county of Tippah and State of Mississippi, have invented certain new and useful Improvements in Hame Tugs, of which the following is a specification.

This invention relates to improvements in hame tugs and aims generally to improve the construction and overcome the various disadvantages presented by hame tugs now in use.

One of the great disadvantages attending the use of the ordinary hame tug is that no means is provided to prevent the trace connection or the trace itself coming in contact with and rubbing the body-side of the collar to which the hame is fitted. As a result after a comparatively short period of use the body-sides of a harness or plow collar which may be otherwise in perfect condition, are found to be cut or completely worn through at the points of location of the hame tugs, and in a great many instances the stitches are severed. When the traces are drawn taut under working conditions the trace connections of the ordinary tugs are caused to swing inwardly and press firmly against the body-sides of the harness collar because, as above stated, no means is provided for limiting this movement and furthermore the connections are ordinarily of such a loose nature that they will rub back and forth across the body-sides of the collar, damaging the same in the manner pointed out above. Therefore one of the primary objects of the present invention is to provide a hame tug so constructed that the trace connection is limited in its movement toward the collar and will be prevented from coming into contact with the body-side or in any event from bearing so firmly against or rubbing across the same as to in any way damage it. Thus by the employment of my improved hame tug, the life of a harness or plow collar is greatly prolonged and the necessity of repairing the collar or even replacing the same as is now the case, is obviated insofar as concerns any likelihood of damaging of the collar by the presence of the hame tugs.

Where chain traces are employed it has heretofore been customary to so construct the hame hooks that no matter in what manner the trace chains are connected therewith, the link of the chain which is connected with the hook will be disposed horizontally and consequently presented edgewise to the collar and as the connection of the link of the chain with the hook is a more or less loose one, these links have been permitted to rub back and forth across the body-side of the collar, under working conditions, thus soon cutting into the collar and damaging the same as before pointed out. Therefore, it is another important object of the invention to provide a hame tug having a trace chain connection so constructed as to provide for the engagement of the chain link therewith in such a manner that the link will be held in substantially vertical position and consequently will have one of its flat sides presented to the face of the collar and will at the same time be spaced from the collar so as to prevent the usual damage to the collar by the chain link. Incidentally the invention has as one of its objects to provide the trace chain connection of the tug with means for the connection of a link of the trace chain thereto which means is so constructed as to securely hold the link stationary so that the same cannot have any appreciable play, thereby preventing any noticeable wear of the link. However, the invention further contemplates that the trace chain connection of the tug shall be so constructed as to in fact space this connected link from the collar and thus positively prevent the link coming in contact with the collar.

Another object of the invention is to so construct the means for connecting the trace chain with the hook of the connection that the chain may be readily applied and disconnected although when applied it is positively held against accidental disengagement from the hook of the connection.

A further object of the invention is to provide a hame tug comprising an attaching member which is secured to the hame, and a trace connecting member which, together with the attaching member is so constructed that the connecting member may be at any time quickly disengaged from the attaching member and equally as readily applied thereto although under working conditions, accidental disengagement of the connecting member from the attaching member is positively prevented.

In connection with the last mentioned feature the invention has as a further object to provide means whereby the trace connecting member may be supported at various elevations upon the attaching member so that the line of draft or pull may be varied as desired.

Another important object of the invention is to so construct the device that none of the parts thereof are susceptible to any material wear except possibly the means for attaching the breast strap ring which, however, can be replaced at a small cost.

In the accompanying drawings:

Figure 1 is a view in side elevation of the hame tug embodying the present invention;

Fig. 2 is a sectional view on the line 2—2 of Fig. 1 looking in the direction indicated by the arrows;

Fig. 3 is a view similar to Fig. 2 illustrating the manner in which the trace connection may be disengaged from the attaching member of the tug.

In the drawings, the attaching member of the tug is indicated in general by the reference numeral 1 and the said attaching member comprises a base plate 2 which is provided with any suitable number of openings 3 for the passage of securing elements of any suitable type whereby the plate may be secured to the outer face of the hame, which latter is indicated by the numeral 4, the collar to which the hame is applied being illustrated in a general manner in Fig. 2 of the drawings and being indicated by the numeral 5. At its lower end, the attaching member 1 has connected with it the usual ring 6 for the connection of the breast strap of the harness (not shown). The plate 2 of the attaching member may be of any desired dimensions and of any desired contour or outline, and preferably cast integral with the plate are a plurality of stop members 7 which extend transversely of the outer face of the said plate and which may be of the general form shown in Fig. 2 of the drawings or of any other desired shape. These members are equidistantly spaced and any desired number of them may be formed upon the plate 2. A connecting bar, indicated in general by the numeral 8, also forms an integral part of the attaching member 1 being preferably cast integral with the stop members 7 and extending longitudinally throughout the series of such members. This bar is designed for the connection of the trace connecting members of the tug and in cross section the bar is approximately semi-cylindrical as most clearly shown in Figs. 2 and 3 of the drawings, the flat or chordal side 9 of the bar being presented outwardly as shown in the said figures and in Fig. 1.

Within the spirit of my invention, I may employ either one of two forms of trace connections as shown in Fig. 1 of the drawings depending upon whether leather traces or chain traces are to be used. For example where a leather trace such as shown at the left in Fig. 1 and indicated by the numeral 10 is to be employed, I make use of the form of connection which is indicated in the drawings by the reference letter A, and where trace chains are to be employed as shown at the right in Fig. 1, I employ a slightly different form of connection which is indicated by the reference letter B. So far as the means provided for adapting the trace connections for engagement with the connecting bar 8 is concerned, the connections A and B are identical in their construction and each includes a pair of spaced arms 11 connected at their outer ends by means to which the leather trace 10 or the chain trace, if the latter is preferably employed, may be connected. At their inner ends the arms are formed in their outer edges each with a notch 12 providing a terminal hook 13, each notch having a throat 14 which is of a width somewhat less than the diameter of the inner portion of the notch, this inner portion being defined by an approximately semi-cylindrical wall and being of a diameter to more or less snugly receive the bar 8. In applying the trace connection to the bar it is necessary that the connection be disposed in a position substantially at right angles outstanding from the attaching member 1 as shown in Fig. 3 of the drawings in which position one wall of the throat 14 of the notch 12 will be presented to the convex inner side of the bar and the opposite wall of the throat will be presented to the flat or chordal side 9 of the bar. With the connection in this position, its hooks 13 may be engaged with the bar so that the bar is received within the notches 12 and after such engagement, the connection may be swung inwardly and rearwardly to assume the normal position as shown in Fig. 2 of the drawings in which position the throats 14 of the notches will be so disposed as to positively insure against accidental disengagement of the hooked terminals of the arms 11 from the said connecting bar 9.

It will be noted by reference to Fig. 2 of the drawings that the inner side of the trace connection is not quite in contact with the roll of the collar 5 and the connection is in fact prevented from pressing against the roll of the collar by forming the inner edges of the arms 11 of the connection with shoulders 15 which, in the position assumed by the connection as illustrated in Fig. 2 of the drawings, bear firmly against the rear edge of the attaching plate 2 for the purpose stated. In this manner the trace connections are positively prevented from rubbing or pressing against the collar and wearing through the roll thereof.

At this point it will be understood that no difficulty whatsoever will be experienced in quickly disconnecting the trace connections from the bar 8 and again applying them to the said bar. It will also be evident by reference to Fig. 1 that the stop members 7 will constitute rests for the lower arms of the trace connections when the tug is in use and is disposed in the customary upright position. Therefore, inasmuch as the stop members 7 are equidistantly spaced, the line of draft or pull may be readily varied by detaching the trace connection from the bar 8 and again engaging the connection with the said bar at a higher or lower point as required. The arms 11 are so spaced that no matter at what elevation their hooked ends are engaged with the bar 8, there will be no interference on the part of the stop members 7, the said ends of the arms in any position of adjustment of the trace connections being located at opposite sides of one of the said stop members 7.

The connection B which is especially designed for use in connection with chain traces will now be more specifically described and particularly as concerns the means provided for the connection of the chain links therewith. It may first be stated that the trace chain, which is indicated in general by the numeral 16 and which is of the ordinary construction, is made up of a number of connected links 17 of uniform dimensions and any of which may be selectively engaged with the connection B. The arms 11 of the connection are united at their outer ends by means of a transversely extending integral web 18 the inner surface 19 of which is smooth and free from obstructions or projections so that even should it come into contact with the body-side of the collar 5, no injury to the collar will result. Formed upon the outer face of this web 18 and preferably integral therewith is a boss 20 which extends longitudinally of the said face of the web and which at its forward end is formed to provide a hook 21 the bill of which is curved forwardly and inwardly and suitably spaced from the forward end edge of the web 18 to provide a throat 22 through which one end of a selected one of the links 17 may be readily passed in engaging the link with or disengaging the same from the said hook. The boss 20, between the inner side of the hook 21 and its rear end, is of a length substantially equal to the length of the opening of any one of the links 17 and the width of the boss is but slightly less than the width of this link opening so that when one end of any one of the links is engaged in the hook 21, the link may be swung to position lying flat against the outer face of the web 18 and circumscribing or surrounding the boss 20 as clearly shown in Fig. 1 of the drawings. In order to prevent accidental movement of the link from this position and which movement would be liable to result in accidental disengagement of the link from the hook, locking means is provided which will now be described. The numeral 23 indicates a spindle which is rotatably fitted through an opening 24 formed through the boss 20 rearwardly of the hook 12 and this spindle has secured upon its outer end a turnbutton or head 25 having radial finger pieces or wings 26 by which it and the spindle may be readily rotated, the spindle being likewise provided at its said end with a diametrical locking bar 27 which in one position of rotation of the locking member is designed to extend transversely of the outer face of the boss 20 with its ends projecting opposite the side bars of the chain link which is engaged with the boss as clearly shown in Fig. 1 of the drawings. The ends of this locking bar need not actually engage the side bars of the link but the purpose of the bar is to prevent the link swinging outwardly about the hook 21 as a center and thus becoming accidentally disengaged from the said hook or having such play as would prove of disadvantage. A resilient washer 28 is fitted onto the inner end of the spindle 23 and is confined between a head 29 formed at this end of the spindle and the bottom or inner wall 30 of a housing recess 31 which is formed in the inner face of the boss 20 and web 18 and is of sufficient depth to house the said washer and head so that these parts cannot come into rubbing contact with the collar roll. The purpose of the spring washer 28 is to constantly hold the spindle drawn inwardly under tension and in this manner the inner side of the locking bar 27, which is transversely convex as indicated by the numeral 32, is held securely in a notch 33 which is formed transversely in the outer face of the said boss 20. Thus the locking member is yieldably held against rotation and cannot therefore become accidentally rotated to such position as to release the link which is engaged with the hook 21. Nevertheless the locking member may be rotated without difficulty so as to extend longitudinally of the boss 20 in which position of its adjustment it will not in any way interfere with the free disengagement of the link from the hook 21 and the reengagement of the same or another link with the said hook. As ordinarily an intermediate link of the trace chain is engaged with the hook 21, one of the links connected therewith will constitute a part of the length of the chain which extends rearwardly whereas the other link connected therewith will constitute a part of the loose or free end of the chain which is permitted to hang free. The former link is indicated specifically by the numeral 17$^a$ and the latter by the numeral 17$^b$ and the ends of both of these links rest in the rear end of the link which is engaged with the hook 21. In order to prevent too great a freedom of movement of the links 17ᵃ and 17ᵇ, it is preferable that the rear end of the boss 20 be recessed at its lower side as indicated by the numeral 34 so as to receive the ends of the said links 17ᵃ and 17ᵇ as clearly shown in Fig. 1. It will be evident from the foregoing that the link of the trace chain which is actually connected with the hook 21 and which fits about the boss 20, is positively prevented from having any appreciable play and it therefore cannot cause any injury to the collar roll even should it come into engagement with the said roll which, however, is unlikely in view of the engagement of the shoulder 15 with the rear edge of the plate of the attaching member 1.

If desired the boss 20 may be formed with a longitudinally extending slot 35 to lighten the weight of the trace connection.

By reference to Fig. 2 of the drawings it will be observed that under working conditions the inner edges of the arms 11 of the trace connection, at points immediately forwardly of the shoulders 15, bear firmly against the outer face of the plate 2 of the attaching member 1 and as a consequence the strain incident to draft is borne by these parts as well as by the bar 8.

Having thus described the invention, what is claimed as new is:

1. A trace connection for a hame tug including a web portion, a boss thereon terminating at one end in a hook, the boss being of a shape and dimensions to substantially fill the opening of a trace chain link engaged with the said hook.

2. A trace connection for a hame tug comprising a member having a web portion, a boss upon the outer face of said portion terminating at one end in a hook for the engagement of a trace chain link, the boss being of a length substantially equal to the length of the opening in the said link whereby to substantially fill the said opening and prevent longitudinal play of the link when engaged with the hook.

3. A trace connection for a hame tug comprising a member having a web portion, a boss upon the outer face of said portion terminating at one end in a hook for the engagement of a trace chain link, the boss being of a length substantially equal to the length of the opening in the said link whereby to substantially fill the said opening and prevent longitudinal play of the link when engaged with the hook, and means upon the boss for retaining the link in such position of engagement.

4. A trace connection for a hame tug comprising a member having a web portion, a boss upon the outer face of said portion terminating at one end in a hook for the engagement of a trace chain link, the boss being of a length substantially equal to the length of the opening in the said link whereby to substantially fill the said opening and prevent longitudinal play of the link when engaged with the hook, and means upon the boss for retaining the link in such position of engagement, the said means comprising a locking bar rotatably mounted upon the said boss and adjutable either to project at its ends over the link engaged about the boss or to position extending longitudinally of the said boss and clear of the link.

5. A trace connection for a hame tug including a web portion, a boss upon one face thereof terminating at one end in a hook for the engagement therewith of a link of a trace chain, the said boss being of a length substantially equal to the length of the opening of the link whereby to restrain the link against longitudinal play when engaged with the hook, the said boss being recessed to receive the bights of other links connected with the first mentioned link.

6. A trace connection for a hame tug including a web portion, a boss upon one face thereof terminating at one end in a hook with which a link of a trace chain may be engaged, the said boss being of dimensions to substantially fill the opening of the link whereby to prevent play of the link when engaged with the hook, a spindle mounted through the boss, a locking member carried by the outer end of the spindle and rotatable either to position to restrain the link against displacement or to position to clear the link, and means tensioning the spindle to retain the locking member in its positions of adjustment.

7. A trace connection for a hame tug including a web portion, a boss upon one face thereof terminating at one end in a hook with which a link of a trace chain may be engaged, the said boss being of dimensions to substantially fill the opening of the link whereby to prevent play of the link when engaged with the hook, a spindle mounted through the boss, a locking member carried by the outer end of the spindle and rotatable either to position to restrain the link against displacement or to position to clear the link, and means tensioning the spindle to retain the locking member in its positions of adjustment, the said means comprising a resilient element upon the other end of the spindle engaging the inner side of the boss.

8. A trace connection for a hame tug including a web portion, a boss upon one face thereof terminating at one end in a hook with which a link of a trace chain may be engaged, the said boss being of dimensions to substantially fill the opening of the link whereby to prevent play of the link when engaged with the hook, a spindle mounted through the boss, a locking member carried by the outer end of the spindle and rotatable either to position to restrain the link against displacement or to position to clear the link, and means tensioning the spindle to retain the locking member in its positions of adjustment, the boss having a transverse seat in which the locking member is engageable and is held when in its said locking position.

9. In a hame tug, an attaching member, spaced stop members upon the attaching member, a connecting bar extending between the said stop members and having its forwardly, rearwardly and inwardly presented sides of cylindrical contour and its outwardly presented side flat, and a trace connection having a hook separably engageable with the said bar and having a restricted throat of a width less than the major diameter of the bar and greater than the minor diameter thereof and presented outwardly in the assembled relation of the parts.

In testimony whereof I affix my signature.

THOS. W. GRAHAM. [L. S.]